United States Patent
Liu et al.

(10) Patent No.: US 12,395,383 B2
(45) Date of Patent: Aug. 19, 2025

(54) IMPEDANCE MATCHING ADAPTER, IMPEDANCE MATCHING SYSTEM, AND IMPEDANCE MATCHING METHOD

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 0 days.

(21) Appl. No.: 18/267,218

(22) PCT Filed: Sep. 5, 2022

(86) PCT No.: PCT/CN2022/117121
§ 371 (c)(1),
(2) Date: Jun. 14, 2023

(87) PCT Pub. No.: WO2023/116052
PCT Pub. Date: Jun. 29, 2023

(65) Prior Publication Data
US 2024/0372756 A1    Nov. 7, 2024

(30) Foreign Application Priority Data
Dec. 20, 2021   (CN) .......................... 202111563868.9

(51) Int. Cl.
*H04L 25/02*     (2006.01)
*H04L 12/40*     (2006.01)

(52) U.S. Cl.
CPC ...... *H04L 25/0278* (2013.01); *H04L 25/0272* (2013.01); *H04L 2012/40215* (2013.01)

(58) Field of Classification Search
None
See application file for complete search history.

(56) References Cited

U.S. PATENT DOCUMENTS

| 10,142,358 B1 | 11/2018 | Bajpai et al. |
| 2002/0041601 A1 | 4/2002 | Breinlinger |
(Continued)

FOREIGN PATENT DOCUMENTS

| CN | 101727431 A | 6/2010 |
| CN | 202159271 U | 3/2012 |
(Continued)

OTHER PUBLICATIONS

Zhang Yi-Fei, et al., New model of unit construction general test-adapter for ATE, Journal of Computer Applications, 2009, pp. 2878-2880, vol. 29 No. 10.

*Primary Examiner* — Anh Q Tran
(74) *Attorney, Agent, or Firm* — Bayramoglu Law Offices LLC

(57) ABSTRACT

An impedance matching adapter, an impedance matching system, and an impedance matching method are provided. The impedance matching adapter includes an internal circuit, and a controller area network (CAN) interface module and an impedance matching module that are electrically connected to the internal circuit. The CAN interface module is configured to be connected to a target network. The impedance matching module is connected to the CAN interface module. The internal circuit is configured to control the impedance matching module to adjust a resistance value between two interfaces of the CAN interface module. In this way, the user can build a hardware circuit automatically through software to realize a bus adapter with configurable impedance, which improves the use efficiency of the general bus adapter.

2 Claims, 1 Drawing Sheet

(56) References Cited

U.S. PATENT DOCUMENTS

| | | | |
|---|---|---|---|
| 2006/0132170 | A1 | 6/2006 | Fahrbach et al. |
| 2008/0136444 | A1* | 6/2008 | Fahrbach ............ G06F 13/4086 |
| | | | 326/30 |
| 2014/0023365 | A1 | 1/2014 | Xi et al. |
| 2016/0036604 | A1* | 2/2016 | Mori ..................... H04L 25/029 |
| | | | 375/296 |
| 2017/0257140 | A1* | 9/2017 | De Haas ............ H04L 25/0298 |
| 2017/0286351 | A1 | 10/2017 | Williams et al. |
| 2018/0260353 | A1 | 9/2018 | de Haas et al. |
| 2018/0270169 | A1 | 9/2018 | Daugherty, III |
| 2018/0367347 | A1* | 12/2018 | Gscheidle ........... H04L 25/0298 |
| 2019/0116480 | A1* | 4/2019 | Schultz ............. H04W 52/0229 |
| 2021/0026793 | A1* | 1/2021 | Mutter ................ G06F 13/4068 |
| 2021/0382843 | A1* | 12/2021 | Schuler ............... G06F 13/4282 |

FOREIGN PATENT DOCUMENTS

| | | |
|---|---|---|
| CN | 105278411 A | 1/2016 |
| CN | 106302063 A | 1/2017 |
| CN | 106534003 A | 3/2017 |
| CN | 207408939 U | 5/2018 |
| CN | 207560031 U | 6/2018 |
| CN | 112363973 A | 2/2021 |
| CN | 213814657 U | 7/2021 |
| CN | 213814658 U | 7/2021 |
| CN | 114253887 A | 3/2022 |
| JP | 2006512842 A | 4/2006 |
| JP | 2009163681 A | 7/2009 |
| JP | 2015026280 A | 2/2015 |
| JP | 2018026791 A | 2/2018 |
| JP | 2021516020 A | 6/2021 |
| RU | 2701382 C1 | 9/2019 |

\* cited by examiner

IMPEDANCE MATCHING ADAPTER, IMPEDANCE MATCHING SYSTEM, AND IMPEDANCE MATCHING METHOD

CROSS REFERENCE TO THE RELATED APPLICATIONS

This application is the national phase entry of International Application No. PCT/CN2022/117121, filed on Sep. 5, 2022, which is based upon and claims priority to Chinese Patent Application No. 202111563868.9, filed on Dec. 20, 2021, the entire contents of which are incorporated herein by reference.

TECHNICAL FIELD

The present invention belongs to the technical field of adapters, in particular, to an impedance matching adapter, an impedance matching system, and an impedance matching method.

BACKGROUND

The prior bus communication, such as controller area network (CAN) bus, FlexRay bus or automobile Ethernet, requires bus impedance matching. Taking the CAN bus as an example, each of both ends of the bus needs to be connected to a terminal resistor of 120 ohms. For general bus adapters, the number of terminal resistors on the network they are connected to is uncertain, which requires the operator to perform an impedance matching operation. In general, there are two cases as follows:

[1] When the impedance of the existing bus is already matched, the connected bus adapter is not allowed to add any terminal resistor.

[2] When the impedance of the existing bus is not matched, the connected bus adapter needs to add a terminal resistor.

In order to be compatible with the impedance of the unknown bus, the general adapter does not carry any terminal resistors, so the task of impedance matching is assigned to the engineer who uses the adapter.

In the prior technical solution, since the task of impedance matching is assigned to the engineer who uses the adapter, it requires the relevant engineer to, on the basis of measuring the impedance of the existing network, add a resistor on the wire harness, or add an adapter with a resistor at the interface, or add a jumper cap on a printed circuit board (PCB) to realize the connection of the resistor, which brings inconvenience to the relevant engineer.

Therefore, in view of the above technical problems, it is necessary to design a new impedance matching adapter, impedance matching system, and method.

SUMMARY

An object of the present invention is to provide an impedance matching adapter, an impedance matching system and an impedance matching method.

In order to solve the above technical problems, the present invention provides an impedance matching adapter, including:

an internal circuit, and a CAN interface module and an impedance matching module that are electrically connected to the internal circuit.

The CAN interface module is configured to be connected to a target network.

The impedance matching module is connected to the CAN interface module.

The internal circuit is configured to control the impedance matching module to adjust a resistance value between two interfaces of the CAN interface module.

Further, the CAN interface module includes at least one CAN_L interface and at least one CAN_H interface.

The CAN_L interface is connected to the internal circuit.

The CAN_H interface is connected to the internal circuit.

The impedance matching module is connected between the CAN_L interface and the CAN_H interface.

The CAN_L interface is configured to be connected to a CAN_L of the target network.

The CAN_H interface is configured to be connected to a CAN_H of the target network.

Further, the impedance matching module includes a relay and a terminal resistor.

One end of the terminal resistor is connected to the relay, and the other end of the terminal resistor is connected to the CAN_H interface.

The relay is connected to the internal circuit and the CAN_L interface.

The internal circuit is configured to control the relay to be switched on/off to adjust the resistance value between the CAN_H interface and the CAN_L interface.

Further, the resistance value of the terminal resistor is configured to be 120 ohms.

Further, the adapter further includes a universal serial bus (USB) interface module electrically connected to the internal circuit.

The USB interface module is connected to a host computer to receive a control instruction from the host computer.

The internal circuit is configured to control the relay to be switched on/off according to the control instruction, and the internal circuit is configured to feed back a status of the relay through the USB interface module.

In the second aspect, the present invention further provides an impedance matching system, including:

a host computer and an adapter.

The adapter is configured to be connected to a target network.

The adapter is configured to receive a control instruction sent by the host computer.

The adapter is configured to adjust a resistance value between two interfaces connected to the target network according to the control instruction.

In the third aspect, the present invention further provides an impedance matching method of an adapter, including:

adjusting an impedance between the adapter and a target network.

Further, a method of adjusting the impedance between the adapter and the target network includes:

connecting or disconnecting a terminal resistor between two interfaces of a CAN interface module according to a control instruction sent by a host computer to adjust a resistance value between the interfaces.

The advantages of the present invention are as follows: in the present invention, the internal circuit and the CAN interface module and the impedance matching module that are electrically connected to the internal circuit are adopted. The CAN interface module is configured to be connected to the target network. The impedance matching module is connected to the CAN interface module. The internal circuit is configured to control the impedance matching module to adjust the resistance value between the two interfaces of the CAN interface module. In this way, the user can build a hardware circuit automatically through software to realize a bus adapter with configurable impedance, which improves the use efficiency of the general bus adapter.

Other features and advantages of the present invention will be described in the subsequent specification and will become apparent in part from the specification or understood through the implementation of the present invention. The objective and other advantages of the present invention are realized and obtained by the structure specifically pointed out in the specification and the drawings.

In order to make the above-mentioned objectives, features, and advantages of the present invention more apparent and easier to understand, the preferred embodiments are given below and described in detail in conjunction with the drawings.

BRIEF DESCRIPTION OF THE DRAWINGS

In order to illustrate the specific embodiments of the present invention or the technical solution more clearly in the prior art, the drawings that need to be used in the description of the specific embodiments or the prior art will be briefly described below. Apparently, the drawings described below are some embodiments of the present invention and for those having ordinary skill in the art, other drawings can be obtained according to these drawings without creative effort.

DETAILED DESCRIPTION OF THE EMBODIMENTS

In order to make the objective, technical solution, and advantages of the embodiments of the present invention clearer, the technical solution of the present invention will be described clearly and completely below in conjunction with the drawings. Apparently, the described embodiments are part of the embodiments of the present invention, not all embodiments. Based on the embodiments of the present invention, all other embodiments obtained by those having ordinary skill in the art without creative effort shall fall within the scope of protection of the present invention.

Embodiment 1

Figure 1:
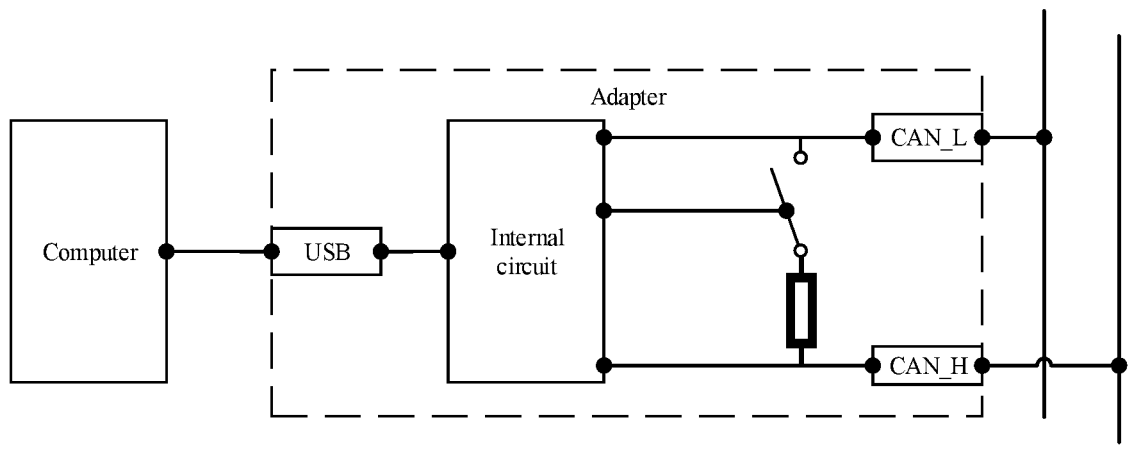
FIG. 1 is a schematic diagram of an impedance matching adapter of the present invention.
Figure 2:
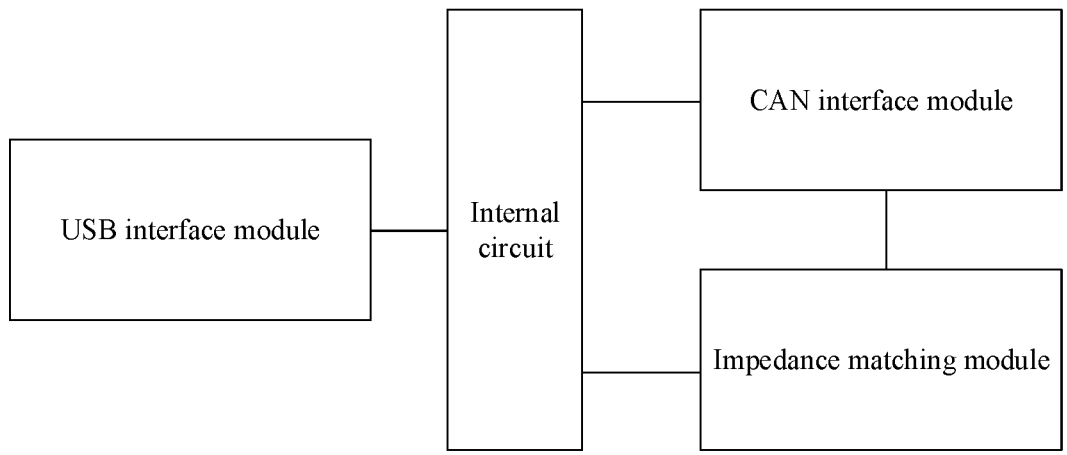
FIG. 2 is a schematic block diagram of the impedance matching adapter of the present invention.

As shown in FIGS. 1 and 2, the present embodiment provides an impedance matching adapter, including an internal circuit, and a CAN interface module and an impedance matching module that are electrically connected to the internal circuit. The CAN interface module is configured to be connected to a target network. The impedance matching module is connected to the CAN interface module. The internal circuit is configured to control the impedance matching module to adjust a resistance value between two interfaces of the CAN interface module. In this way, the user can build a hardware circuit automatically through software to realize a bus adapter with configurable impedance, which improves the use efficiency of the general bus adapter.

In the present embodiment, the CAN interface module includes at least one CAN interface, namely at least one CAN_L interface and at least one CAN_H interface. The CAN_L interface is connected to the internal circuit. The CAN_H interface is connected to the internal circuit. The impedance matching module is connected between the CAN_L interface and the CAN_H interface. The CAN_L interface is configured to be connected to the CAN_L of the target network. The CAN_H interface is configured to be connected to the CAN_H of the target network.

In the present embodiment, the impedance matching module includes a relay and a terminal resistor. One end of the terminal resistor is connected to the relay, and the other end of the terminal resistor is connected to the CAN_H interface. The relay is connected to the internal circuit and the CAN_L interface. A control end of the relay is connected to the internal circuit, and the switching on/off of the relay is determined by the logic of the internal circuit. The internal circuit is configured to control the relay to be switched on/off to adjust the resistance value between the CAN_H interface and the CAN_L interface. The terminal resistor is introduced into the adapter, and the terminal resistor is connected or disconnected between the two interfaces through the switching on/off of the relay, such that the manual operation of the user of the adapter can be completely replaced by the internal circuit or the software program set in a host computer, which improves the use efficiency of the adapter and solves the difficulty of dynamic matching of the terminal resistor of the adapter.

In the present embodiment, the resistance value of the terminal resistor is configured to be 120 ohms, and the terminal resistor of 120 ohms can easily match the desired impedance.

In the present embodiment, the adapter further includes a USB interface module electrically connected to the internal circuit. The USB interface module is connected to the host computer to receive a control instruction from the host computer. The internal circuit is configured to control the relay to be switched on/off according to the control instruction, and the internal circuit is configured to feed back a status of the relay through the USB interface module. The software in the host computer can send the switching-on/off instruction of the relay through the USB interface module and can simultaneously read the status of the relay through the USB interface module.

In the present embodiment, the internal circuit includes a microcontroller configured to process a USB signal and the microcontroller can also control its IO port to switch on/off the relay. Moreover, the software program can be preset in the microcontroller and the relay can be directly controlled by the internal circuit itself to be switched on/off.

Embodiment 2

Embodiment 2 provides an impedance matching system, including a host computer and an adapter. The adapter is configured to be connected to a target network. The adapter is configured to receive a control instruction sent by the host computer. The adapter is configured to adjust a resistance value between two interfaces connected to the target network according to the control instruction.

In the present embodiment, the adapter is configured as the impedance matching adapter in Embodiment 1.

Embodiment 3

Embodiment 3 provides an impedance matching method of the adapter in Embodiment 1, including adjusting an impedance between the adapter and a target network.

In the present embodiment, the method of adjusting the impedance between the adapter and the target network includes connecting or disconnecting a terminal resistor between two interfaces of a CAN interface module according to a control instruction sent by a host computer to adjust a resistance value between the interfaces.

To sum up, the present invention is implemented by the internal circuit and the CAN interface module and the impedance matching module that are electrically connected to the internal circuit. The CAN interface module is configured to be connected to the target network. The impedance matching module is connected to the CAN interface module. The internal circuit is configured to control the impedance matching module to adjust the resistance value between the two interfaces of the CAN interface module. In this way, the user can build a hardware circuit automatically through software to realize a bus adapter with configurable impedance, which improves the use efficiency of the general bus adapter.

In several embodiments provided in the present invention, it should be understood that the device and method disclosed can also be implemented in other ways. The device embodiments described above are only schematic. For example, the flow chart and block diagram in the drawings show the possible architecture, functions and operations of devices, methods, and computer program products according to multiple embodiments of the present invention. At this point, each box in the flow chart or block diagram may represent a part of a module, a program segment, or a code, and the part of the module, the program segment, or the code contains one or more executable instructions for implementing a specified logical function. It should also be noted that in some alternative implementations, the functions marked in the box may also occur in an order different from that indicated in the drawings. For example, two consecutive boxes can actually be executed basically in parallel, and they can sometimes be executed in the opposite order, which depends on the functions involved. It should also be noted that each box in the block diagram and/or flow chart, and the combination of blocks in the block diagram and/or flow chart, may be implemented by a dedicated hardware-based system that performs a specified function or action, or by a combination of dedicated hardware and computer instructions.

In addition, each functional module in each embodiment of the present invention can be integrated to form an independent part, or each module can exist independently, or two or more modules can be integrated to form an independent part.

If the function is implemented in the form of a software function module and sold or used as an independent product, it can be stored in a computer-readable storage medium. Based on this understanding, the technical solution of the present invention, in essence, is that the part that contributes to the prior art or a part of the technical solution can be reflected in the form of a software product. The computer software product is stored in a storage medium and includes a plurality of instructions to allow a computer device (such as a personal computer, a server, or network equipment, etc.) to perform all or part of the steps of the method described in each embodiment of the present invention. The aforementioned storage medium includes a USB flash drive, a mobile hard disk drive, a read-only memory (ROM), a random-access memory (RAM), a magnetic disk, an optical disc, and other media that can store program codes.

Taking the above ideal embodiments according to the present invention as inspiration, through the above explanation content, those skilled in the art may make various changes and modifications without deviating from the scope of the technical idea of the present invention. The technical scope of the present invention is not limited to the contents of the specification but must be determined according to the scope of the claims.

What is claimed is:

1. An impedance matching adapter, comprising: an internal circuit, a controller area network (CAN) interface module and an impedance matching module, wherein the CAN interface module and the impedance matching module are electrically connected to the internal circuit;
   the CAN interface module is configured to be connected to a target network;
   the impedance matching module is connected to the CAN interface module; and
   the internal circuit is configured to control the impedance matching module to adjust a resistance value between two interfaces of the CAN interface module;
   wherein the CAN interface module comprises at least one CAN_L interface and at least one CAN_H interface;
      wherein the at least one CAN_L interface is connected to the internal circuit;
      the at least one CAN_H interface is connected to the internal circuit;
      the impedance matching module is connected between the at least one CAN_L interface and the at least one CAN_H interface;
      the at least one CAN_L interface is configured to be connected to a CAN_L of the target network; and
      the at least one CAN_H interface is configured to be connected to a CAN_H of the target network;
   wherein the impedance matching module comprises a relay and a terminal resistor;
      wherein a first end of the terminal resistor is connected to the relay, and a second end of the terminal resistor is connected to the at least one CAN_H interface;
      the relay is connected to the internal circuit and the at least one CAN_L interface; and
      the internal circuit is configured to control the relay to be switched on/off to adjust the resistance value between the at least one CAN_H interface and the at least one CAN_L interface;
   wherein the impedance matching adapter further comprises a universal serial bus (USB) interface module electrically connected to the internal circuit;
      wherein the USB interface module is connected to a host computer to receive a control instruction from the host computer; and
      the internal circuit is configured to control the relay to be switched on/off according to the control instruction, and the internal circuit is configured to feed back a status of the relay through the USB interface module.

2. The impedance matching adapter according to claim 1, wherein a resistance value of the terminal resistor is configured to be 120 ohms.

\* \* \* \* \*